RESPONSE CHARACTERISTICS OF A STANDARD CAR

INVENTORS
TADAHIRO OHTSUKA
KOUKI TAKAHASHI
MICHIO MIYABE

BY

ATTORNEYS

Jan. 27, 1970     TADAHIRO OHTSUKA ET AL     3,491,846
LAG REDUCING MEANS FOR STEERING MECHANISMS
OF DIRIGIBLE VEHICLES
Filed June 5, 1968                          5 Sheets-Sheet 3

INVENTOR
TADAHIRO OHTSUKA
KOUKI TAKAHASHI
MICHIO MIYABE
BY
ATTORNEYS

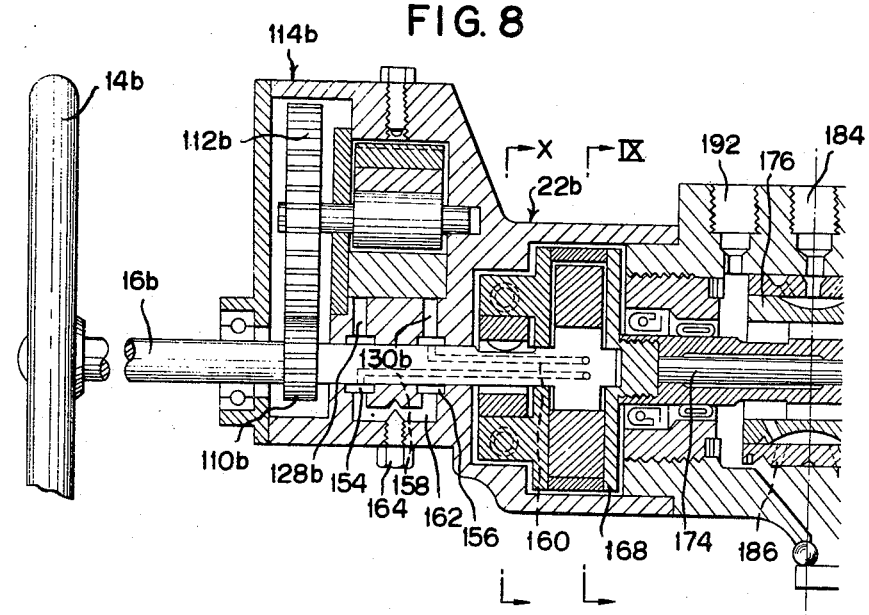
FIG. 8
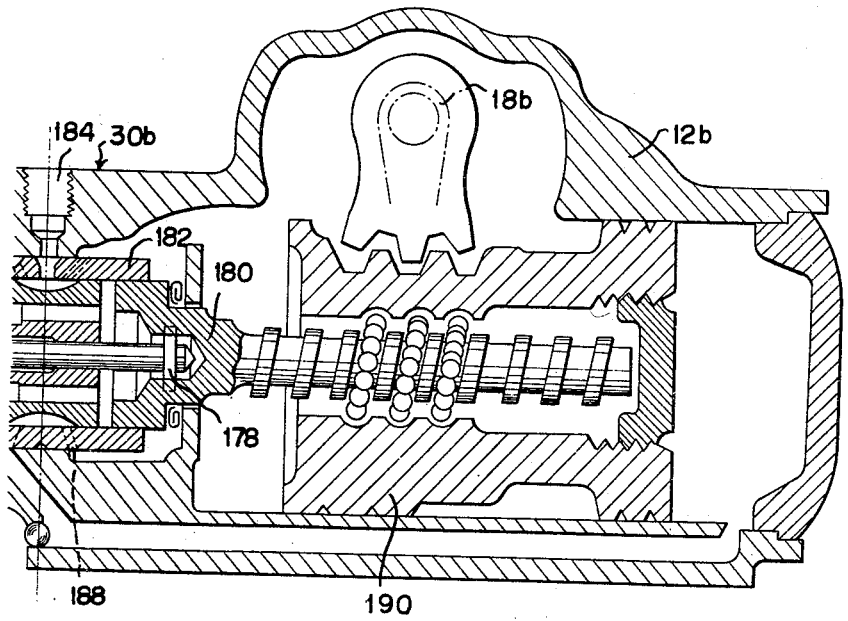
INVENTOR
TADAHIRO OHTSUKA
KOUKI TAKAHASHI
MICHIO MIYABE
BY
ATTORNEYS Jan. 27, 1970 TADAHIRO OHTSUKA ET AL 3,491,846
LAG REDUCING MEANS FOR STEERING MECHANISMS
OF DIRIGIBLE VEHICLES
Filed June 5, 1968 5 Sheets-Sheet 5

INVENTORS
TADAHIRO OHTSUKA
KOUKI TAKAHASHI
MISHIO MIYABE
BY
ATTORNEYS

United States Patent Office 3,491,846
Patented Jan. 27, 1970

3,491,846
LAG REDUCING MEANS FOR STEERING MECHANISMS OF DIRIGIBLE VEHICLES
Tadahiro Ohtsuka, Nagoya-shi, Kouki Takahashi, Aichi-ken, and Michio Miyabe, Gifu-shi, Japan, assignors to Messrs. Mitsubishi Jukogyo Kabushiki Kaisha, Tokyo, Japan
Filed June 5, 1968, Ser. No. 734,590
Claims priority, application Japan, Aug. 22, 1967, 42/53,859; Oct. 2, 1967, 42/63,443
Int. Cl. B62d 5/06; F15b 15/22
U.S. Cl. 180—79.2
10 Claims

ABSTRACT OF THE DISCLOSURE

A steering mechanism for dirigible vehicles, such as automotive vehicles, includes means for reducing the lag between operation of the steering wheel and turning of the wheels. The phase advancing means includes a container filled with a working fluid and divided into two chambers by a partition member movable relative to the container, the two chambers being interconnected by adjustable throttling means. One chamber of the container and the movable partition is connected to a steering wheel and the other is connected to a steering member, such as a control valve of power steering mechanism or a steering linkage. The relative displacement of the container and the partition member therein accelerates the response of the steering mechanism to operation of the steering wheel.

BACKGROUND OF THE INVENTION

One method of evaluating the steering response characteristics of an automotive vehicle is the so-called frequency response method. This method uses the angular displacement of a steering wheel as input and the turning movement or "yaw" rate of the vehicle chassis as the output. When analyzing a response delay between the driver, the vehicle steering system, and the vehicle body, it has been found that, when an automotive vehicle is running at low speed, the driver has sufficient time to correct and compensate for any response delay in the steering operation. Thus, the risk of accident is relatively low. However, in high speed driving, a big accident risk can be caused because the driver does not have sufficient time to correct and compensate for the response delay in steering of the vehicle.

SUMMARY OF THE INVENTION

This invention relates to the steering mechanisms for automotive vehicles and, more particularly, to novel phase advancing means for greatly reducing, if not eliminating, the lag between the initiation of angular displacement of a steering wheel and the turning of the vehicle in response to such initiation.

In accordance with the invention, there is included, in the steering mechanisms, a container or housing containing oil or other working fluid, and which encloses a partition member dividing the interior of the container into two chambers, this partition member being movable relative to the container. The two chambers are interconnected by a branch conduit in which is located a throttle member which is preferably adjustable. One of the two elements, comprising the container and the partition member, is connected mechanically with the steering wheel, or a part connected thereto, while the other element is connected with a member of the steering mechanism such as, for example, the control valve of a power steering mechanism or a link in the steering linkage. By this arrangement, the steering member is displaced, response to angular displacement of the steering wheel, in such a manner that it can lead, with respect to relative phase, an angular displacement of the steering wheel, this being effected in response to angular adjustment of the steering wheel. Thereby, the steering response characteristics of the steering mechanism of an automotive vehicle can be effectively improved.

The partition member is normally balanced to a point separating its container into two equal volume chambers and, upon an angular displacement of the steering wheel, tending to move the steering member, the partition member is momentarily displaced increasing substantially the fluid pressure in one chamber and decreasing substantially the fluid pressure in the other chamber. This increase is in such a direction that the partition member is displaced in a direction to "lead" the angular displacement of the steering wheel, and this substantially fully compensates any possible lag in the response of the steering mechanism to angular displacement of the steering wheel. As a feature of the invention, the increase in the fluid pressure in one chamber, responsive to movement or angular displacement of the steering wheel, can be augmented by connecting a gear pump, a vane pump, or the like to the steering wheel to be driven responsive to angular displacement of the steering wheel, in one direction or the other, to increase the transfer of fluid to one chamber relative to the other chamber.

The phase advancing means is applicable not only to power steering mechanisms but also to manual steering mechanisms.

An object of the invention is to provide a phase advancing means for use in the steering mechanism of a dirigible vehicle to minimize the response delay of the steering mechanism.

Another object of the invention is to provide such a means which increases the safety of steering at high speeds.

A further object of the invention is to provide a compact, lightweight and efficient phase advancing means of this type.

Still another object of the invention is to provide such a compact, lightweight and efficient phase advancing means which can be applied either to power steering mechanisms or to manual steering mechanisms.

A further object of the invention is to provide such a steering lag reducing apparatus which can be installed as a unit in either a power steering mechanism or a manual steering mechanism.

BRIEF DESCRIPTION OF THE DRAWINGS

For an understanding of the principles of the invention, reference is made to the following description of typical embodiments thereof as illustrated in the accompanying drawings.

In the drawings:

FIGS. 8A and 8B, when aligned, constitute a longitudinal sectional view showing the invention as applied to a power steering mechanism of the type including a rotary control valve.

DESCRIPTION OF THE PREFERRED EMBODIMENTS

Figure 1:
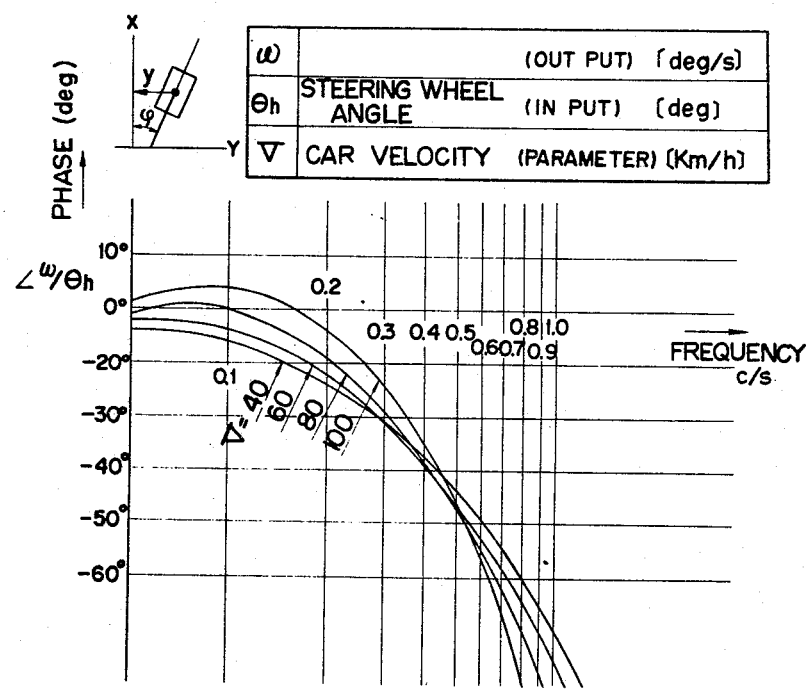
FIG. 1 is a diagram graphically illustrating steering response characteristics of an automotive vehicle.

Referring first to FIG. 1, which graphically illustrates the frequency response characteristics of the steering mechanism of a passenger automobile, the relation between the angular displacement of a steering wheel and a phase characteristic of a "yaw rate" or angular deviation rate of the automobile is explained, with the quantity $\angle \omega/\theta h$ being shown as an ordinate and the rotational frequency of the steering wheel, cycle/sec., as the abscissa. In the graphical illustration of FIG. 1, $\omega$ indicates the yaw rate or deviation rate of a body in degrees per second (deg./sec.) and $\theta h$ indicates the angular displacement of a steering wheel in degrees (deg.). The vehicle speed $v$, in km./hr., is illustrated as a parameter.

When the rate of angular displacement, or frequency, of the steering wheel is in a low range, the phase lag of the yaw rate with respect to the steering wheel is small. However, at high rates of angular displacement or high frequency, of the steering wheel, the response of the yaw rate or deviation becomes very poor, and the phase lag, with respect to angular displacement of the steering wheel, increases rapidly.

Still referring to FIG. 1, if the direction of movement of the vehicle with respect to a preselected direction $x$ is indicated as $\phi$, the relation $d\phi/dt=\omega$ (yaw rate) is obtained, and the angle $\phi$ lags, in phase, by 90° with respect to the yaw rate. In addition, when the transverse displacement of the vehicle as a result of steering is designated $y$, there occurs the relation $dy/dt=v\phi$, so that the transverse displacement $y$ lags in phase by 90° with respect to the directional angle $\phi$. In other words, the transverse displacement of the body $y$ with respect to angular displacement of the steering wheel lags, with respect to phase, by more than 180°.

When an automobile is driven at a low speed, the driver or operator has sufficient time to correct and compensate for this lag, even when he notices the lag only after the operation of the steering wheel, and thus no particular danger is incurred. However, with high speed driving, a major accident can be caused because the driver does not have sufficient time to correct and compensate for the above-mentioned delay in the response of the steering mechanism.

Figure 2:
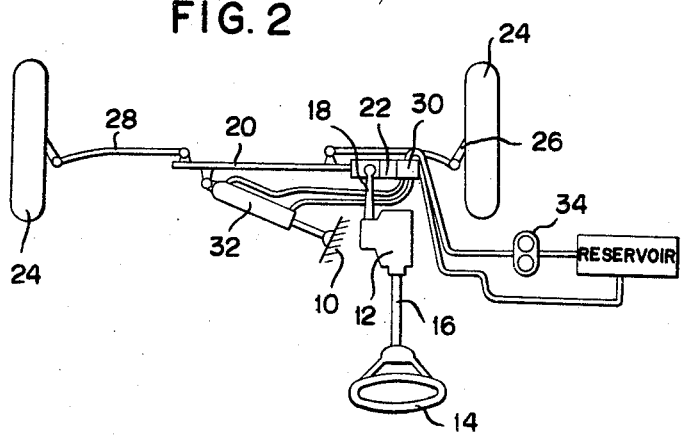
FIG. 2 is a schematic plan view illustrating a power steering mechanism incorporating the invention.

FIG. 2 illustrates an embodiment of the invention in which the phase advancing or lag reducing means of the invention has been incorporated into a power steering mechanism for an automotive vehicle. Referring to FIG. 2, the vehicle frame is indicated at 10 and a gear box 12 is installed on frame 10, the input of the gears in box 12 being connected to shaft 16 rotated by steering wheel 14. In the usual manner, gear box 12 contains reduction gearing for reducing the steering effort required by the driver. The steering effort applied to steering wheel 14 is transmitted, through the reduction gearing in housing 12, to an output arm 18 and with increased torque. The free end of arm 18 is connected to a phase advancing means or lag reducing means indicated generally at 22 and which will be described in detail hereinafter, and is also mechanically connected to one end of a radius rod or arm 20. The other end of radius rod 20 is connected to a tie rod 28 which, through knuckle arm 26, causes front wheels 24, supported on king pins, to turn about the respective king pins.

The displacement of arm 18 is not transmitted directly to radius rod 20, but is transmitted to a control valve 30 through the phase advancing means 22. One end of a fluid pressure responsive actuator, such as a cylinder piston arrangement 32, is connected to radius rod or arm 20. Working fluid, such as oil, is maintained under pressure by a pump 34, and is supplied to actuator 32, in one direction or the other, in accordance with the degree and direction of displacement of control valve 30 from a neutral position. This turns front wheels 24 through radius rod or arm 20 and tie rod 28, and thus causes a change of direction of movement of the vehicle.

Figure 3:
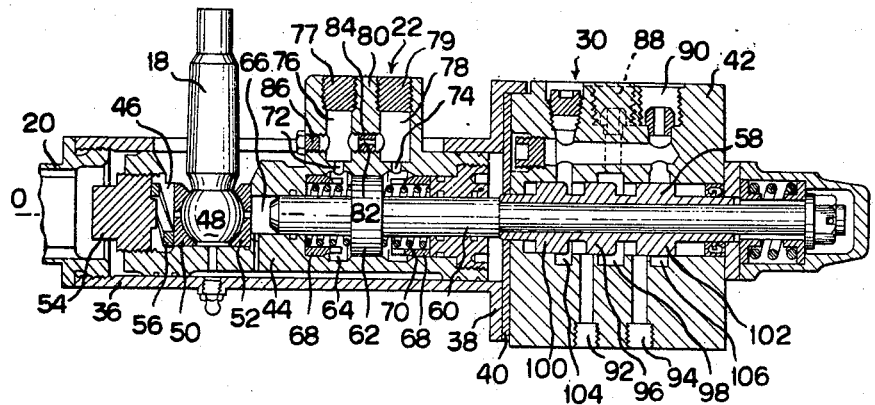
FIG. 3 is a longitudinal or axial sectional view of the phase advancing or lag reducing means illustrated schematically in FIG. 2.

FIG. 3 illustrates the assembly of phase advancing or lag reducing means 22 and control valve 30. An outer cylinder 36 has one end threadedly joined to radius rod 20, and the other end of outer cylinder 36 is connected to a housing 42, of control valve 30, through the medium of a flange 38 and a seat member 40. An inner cylinder 44 is slidably mounted in outer cylinder 36 for axial displacement relative thereto along the longitudinal axis O—O of radius rod 20. The ball-type end of torque arm 18 is disposed in a recess 46 formed near the outer end of inner cylinder 44, this ball-type end being engaged with complementarily spherical seats 50 and 52. Seat 50 is pressed against spherical or ball end 48 of torque arm 18 by a spiral spring 55 whose bias is adjustable by a plug 54 screwed into the outer end of cylinder 44.

Cylinder 44 forms a housing for piston 62 on a piston rod 60 on which is mounted spool-type valve 58 of control valve 30. For this purpose, cylinder 44 is formed with large diameter bores 64 interconnected by a smaller diameter bore 66 serving as a guiding surface for piston 62. Within the large diameter bore 64, equal strength springs 70 are provided and are seated in cylindrical spring retainers 68, springs 70 engaging opposite surfaces of piston 62.

Bores 64 on opposite sides of piston 62 communicate with respective oil chambers 76 and 78 through respective ports 72 and 74. Chambers 76 and 78 have openings which are sealed, in a fluid-tight manner, by respective plugs 77 and 79. The chambers 76 and 78 are separated by a partition wall 80 having an aperture therethrough threadedly receiving a plug 84 having an orifice 82 of a preselected diameter, so that oil chambers 76 and 78 are interconnected with each other through orifice 82. Another plug 86 is threaded into an aperturer in a wall of oil chambers 76, this aperture being coaxial with orifice 82. Thus, the plug 84 can be interchanged, with another plug 84 having an orifice of the same or a different size, by removing plug 86.

Control valve 30 has a known type of construction, so that detailed explanation of the construction is believed not necessary. A fluid inlet port 88 and a fluid exhaust port 90 are provided in housing 42, port 88 being connected to pump 34 while port 90 is connected to an oil reservoir or sump. Housing 42 is also formed with delivery and return ports 92 and 94 which are connected to fluid pressure actuator 32 through known conduit means.

Control valve 30 normally is an open-center underlapped valve. When valve spool 58 is in the neutral position, its center or central land is centered on annular groove 98 within housing 42, groove 98 communicating with inlet port 88. The left and right lands 100 and 102, respectively, are centered on respective annular grooves 104 and 106 in housing 102, these grooves communicating with return or exhaust port 90. Consequently, the oil under pressure is not supplied to either of the delivery and return ports 92 and 94.

However, when spool valve 58 is displaced from its neutral position to the left, as indicated in FIG. 3, annular channel 98 communicates with port 94, so that pressurized oil from inlet port 88 can enter the corresponding chamber, of fluid pressure actuator 32, connected to port 94. The other chamber of fluid pressure actuator 32 is connected to port 92 and returns the oil to the reservoir through annular channel 104 and return port 90. This operates fluid pressure actuator 32 in a selected direction. On the other hand, when spool valve 58 is displaced to the right, port 92, connected to the other chamber of fluid pressure actuator 32, communicates with channel 98 and thus fluid under pressure is supplied to such other chamber of actuator 38. Correspondingly, port 94 is connected to the reservoir or sump through channel 106 and exhaust or return port 90. Consequently, actuator 32 then operates in the opposite direction, When steering wheel 14 is in its neutral position, spool valve 58 is also in its neutral position. The chambers 76 and 78, and the orifice 82 interconnecting the same, are always completely filled with oil. When wheel 14 is angularly displaced in the counterclockwise direction, arm 18 is displaced to the right, as viewed in FIG. 3. Inner cylinder 44 is thus moved to the right by the pressure exerted by ball end 48 on seat 52. This compresses the lefthand spring 70 and, under the increased spring bias, piston 62 and piston rod 60 are displaced from the neutral position to the right. At the same time, the oil in bore 64 on the left side of piston 62, and in oil chamber 76, is instantly compressed, so that a pressure difference is produced between chambers 76 and 78 and the left and right bores 64, respectively, with the pressure in chamber 76 and left bore 64 being substantially greater than that in chamber 78 and right bore 64.

The effective force due to this pressurer difference depends on the flow resistance corresponding to the velocity of flow of oil through orifice 82. This flow velocity is proportional to the speed of relative displacement between inner cylinder 44 and piston 62, so that it is also dependent on the angular velocity of steering wheel 14. Consequently, piston 62 and piston rod 60 have exerted thereon a force proportional to the relative displacement of arm 18 and inner cylinder 44, and also a force dependent on the angular velocity of turning of steering wheel 14. Piston 62 and rod 60 are thus displaced to the right.

Thus, as compared with the case in which piston rod or valve stem 60 is displaced in proportion to the angular displacement of steering wheel 14, or in proportion to the displacement of arm 18, the response of piston rod or valve stem 60 occurs much sooner. Thus, the response of fluid pressure actuator or power cylinder 32 occurs much sooner and the phase delay or lag is greatly reduced.

When steering wheel 14 is rotated in a clockwise direction, inner cylinder 44 is displaced to the left, by displacement of arm 18, through spring 56 interposed between seat 50 and plug 54. Thus, piston 62 is displaced to the left through the medium of righthand spring 70. At the same time, and in the same manner as mentioned above, a pressure difference is produced across piston 62, so that the phase of displacement of piston rod or valve stem 60 and spool valve 58 is advanced.

Figure 4:
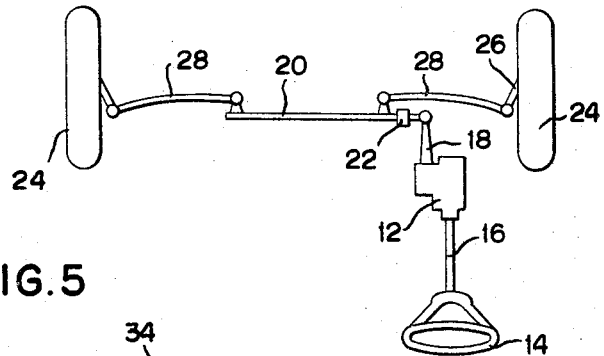
FIG. 4 is a schematic plan view illustrating a manual steering mechanism embodying the invention.

In FIG. 4, the phase advancing or lag reducing mechanism shown in FIG. 3, is partly modified and is applied to a manual steering apparatus, with parts substantially the same as those shown in FIG. 2 being given corresponding reference numerals and being not explained in detail.

It will be noted that fluid pressure actuator or power cylinder 32 is omitted in FIG. 4, and radius rod 20 is connected directly to arm 18 of gear box 12 through phase advancing means 22. In this embodiment of the phase advancing means, the housing 42 and spool valve 58 of control valve 30 are omitted, and piston rod 60 connected to piston 62 is connected to outer cylinder 36 in turn connected to radius rod 20. As mentioned above, in connection with FIG. 3, a displacement of stem 60 and radius rod 20 is the sum of the displacement proportional to an angular displacement of steering wheel 14 and the displacement dependent on the angular velocity of displacement of steering wheel 14. Thereby, the phase advancing or lag reducing effect is obtained also in the arrangement shown in FIG. 4.

Figure 5:
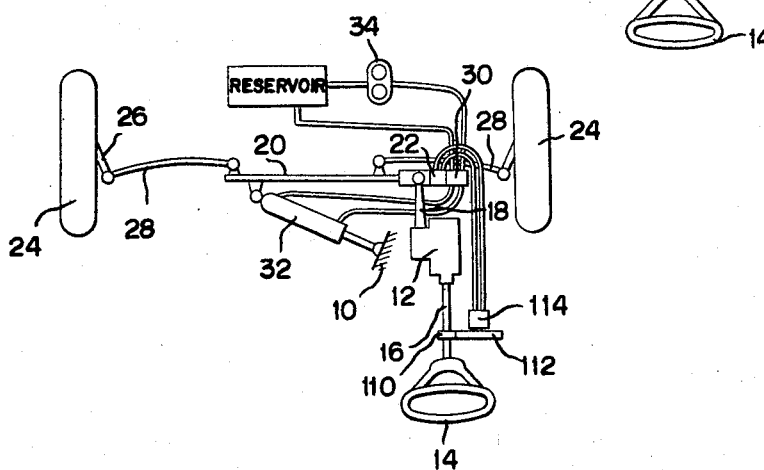
FIG. 5 is schematic plan view, similar to FIG. 2, but illustrating an alternative embodiment of the invention including a pressurizing pump.

FIG. 5 schematically illustrates a further improved phase advancing or lag reducing means for use with power steering mechanism. The difference between the embodiment of the invention shown in FIG. 5 and that shown in FIGS. 2 and 3, is that a pump 114, which may be, for example, a rotary vane-type of pump, is connected to rotate with steering shaft 16 through gears 110 and 112. The delivery and return ports of pump 114 are connected to oil chambers 76 and 78 of inner cylinder 44, shown in FIG. 3, through suitable conduits as illustrated in FIG. 5. Connection of oil chambers 76 and 78 to these conduits is easily effected by removing the respective plugs 77 and 79 and inserting, in place thereof, known fittings.

Figure 6:
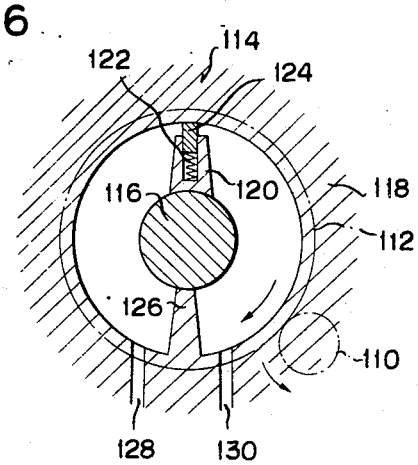
FIG. 6 is diametric sectional view through the pressurizing pump shown in FIG. 5.

A preferred form of pump 114 is illustrated in FIG. 6, in which gears 110 and 112 are shown by dot and dash line. The shaft of gear 112 and the shaft 116 are integral with each other and are mounted concentrically in a pump casing 118. Normally, a steering wheel, such as the wheel 14, is so designed that a full steering movement can be obtained in about two complete rotations in either the clockwise or counterclockwise direction. Therefore, the gear ratio between shaft 16 and pump 114 is selected to be about 1:4 so that, while pinion 110 rotates two turns, gear 112 will rotate about one half a turn.

Shaft 116 is provided with a radially projecting vane 120, and a sealing member 124 is mounted in the outer end of vane 120, being biased into sealing engagement with the inner surface of casing 118 by a spring 122 in a groove of vane 120 slidably receiving sealing member 124. Casing 118 is provided with a radially inwardly extending partition wall and abutment 126, and delivery and return ports 128 and 130 are formed in the casing on opposite sides of wall 126. In FIG. 6, the parts are illustrated in the position which they occupy when steering wheel 14 is in its neutral position, and it will be noted that vane 120 and wall 126 extend in diametric opposition to each other.

Port 130 communicates with oil chamber 76 of FIG. 3, while port 128 communicates with oil chamber 78. Therefore, when steering wheel 14 is rotated in the counterclockwise direction, for example, steering shaft 16 and pinion 110 rotate with each other at the same time, so that gear 112, meshing with pinion 110, and pump shaft 116, rotate in the clockwise direction. Thereby oil is supplied to oil chamber 76 through port 130, while the oil in chamber 78 flows into the port 128. Thus, the pressure difference across piston 62 is increased to a greater extent than in the case of the embodiment of the invention shown in FIG. 3. The displacement phase of valve stem 60, with respect to the angular displacement of steering wheel 14, will be advanced, and the "gain" of the stem displacement will be increased.

The means just described can also be applied to a manual steering apparatus by eliminating fluid pressure actuator or power cylinder 32, control valve 30, oil pump 34 and components associated with these components, and by connecting stem 60 directly to outer cylinder 36. The phase advancing effect is the same as that just described for FIGS. 5 and 6.

Figure 7:
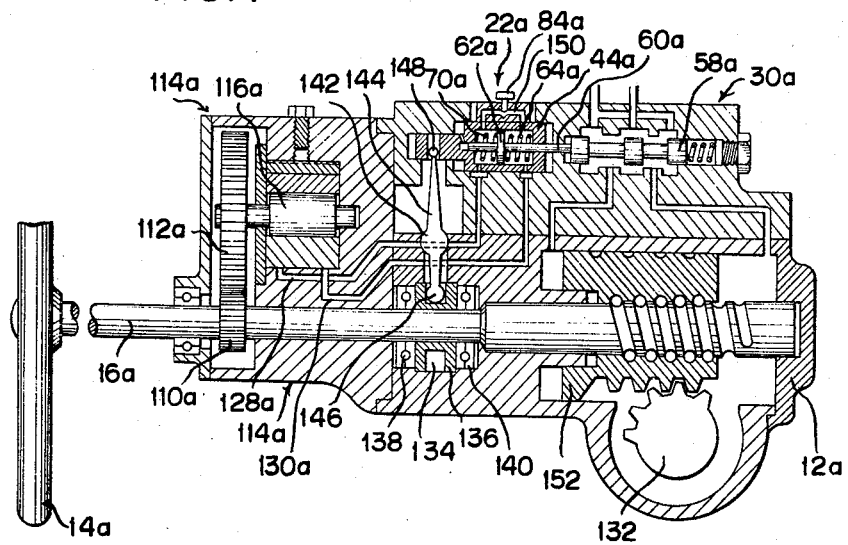
FIG. 7 is a longitudinal or sectional view illustrating details of the apparatus of the invention as applied to power steering mechanisms of the type including a spool-type control valve.

In the example so far described, the phase advancing means 22 is provided in the radius rod 20 but, in the embodiment of the invention shown in FIG. 7, the phase advancing means and its related parts are arranged around the steering shaft. Accordingly, in FIG. 7, those parts corresponding to parts already described have been denoted by the same reference numeral with the postscript *a*.

Referring to FIG. 7, the steering mechanism comprises a steering wheel 14*a*, a steering shaft 16*a*, a gear housing or box 12*a*, etc., as well as including a pump 114*a* which is the same as that shown in FIG. 6 and is interlocked with steering shaft 16*a*. The mechanism further includes a phase advancing means 22*a* and a control valve 30*a*. All of the housings are combined into a single unit in which they are combined in adjacent relation, and the housings are arranged around steering shaft 16*a*. When steering shaft 16*a* is rotated in the clockwise direction, for example, the shaft is first displaced slightly to the right, as viewed in the drawing, as the steering resistance of the front wheels is effective, through a steering linkage, on a gear 132 in gear housing 12a and which is connected to a pitman arm which has not been shown. A collar 136 is fixed substantially centrally of shaft 16a, as viewed in FIG. 7, and has an annular groove 134 around its periphery. Thrust bearings 138 and 140 are firmly positioned on opposite sides of collar 136. Collar 136 and thrust bearings 138 and 140 are mounted on gear box 12a so as to provide for a slight displacement of shaft 16a in the axial direction.

A ball or spherical end 146 of a lever 144, which is pivoted at a substantially central fulcrum 142 on gear box 12a, is engaged in groove 134 of collar 136 so that lever 144 swings counterclockwise about fulcrum 142 responsive to displacement of shaft 16a to the right as viewed in FIG. 7.

The opposite end of lever 144 also has a ball or spherical end 148, and end 148 is connected to the inner cylinder 44a of phase advancing means 22a. Due to the fact that the upper arm of lever 144, as viewed in FIG. 7, is longer than the lower arm of lever 144, the axial displacement of shaft 16a to the right is magnified, as transmitted to cylinder 44a, to result in a greater movement of cylinder 44a to the left. An oil chamber 64a is provided in cylinder 44a, and houses a piston 62a for sliding movement. Springs 70a, of equal strength, are positioned on opposite sides of piston 62a, and the oil chambers on the opposite sides of piston 62a communicate with each other through a passage 150 in which is included an adjustable throttle element 84a.

In response to displacement of cylinder 44a to the left, as mentioned above, piston 62a is displaced to the left through spring 70a, and a pressure difference is created between the oil chambers on the right and left sides of piston 62a and corresponds to the displacement speed of cylinder 44a. Thus, the phase of displacement of piston 62a to the left is advanced relative to the displacement of steering shaft 16a.

Due to the rotation of shaft 16a, pump shaft 116a is rotated counterclockwise through pinion 110a and gear 112a, and forces working fluid to enter, through port 128, the oil chamber on the left side of piston 62a with oil being withdrawn from the right side of piston 62a through port 130a. Thus, a pressure difference is produced across piston 62a, and is the sum of the pressure difference caused by the rate of displacement of inner cylinder 44a relative to piston 62a and the rate of displacement of steering wheel 14a. Thereby, a very substantial phase advancing effect and gain value are obtained.

Piston rod or stem 16a of piston 62a is connected to spool valve 58a to control the pressurized working fluid acting on rack-piston-nut 152 within gear box 12a to assist rotation of gear 132, so that power steering is effected. If pump 114a is omitted from the apparatus of FIG. 7, then both the angular gain of gear 132, or pitman arm 18a, relative to the angular displacement of steering wheel 14a, and the degree of phase advance are reduced, as mentioned in connection with the apparatus of FIG. 3. Nevertheless, a considerable phase advancing effect is still obtained.

Figure 9:
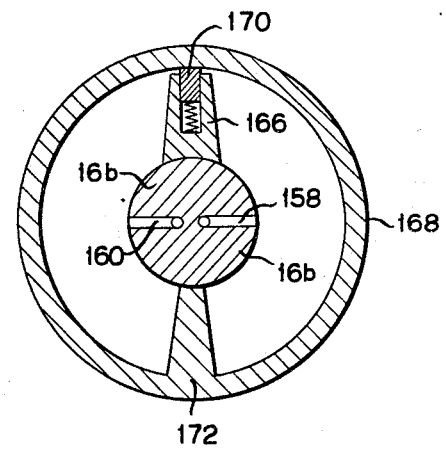
FIGS. 9 and 10 are transverse sectional views taken along the lines IX—IX and X—X, respectively, of FIG. 8.
Figure 10:
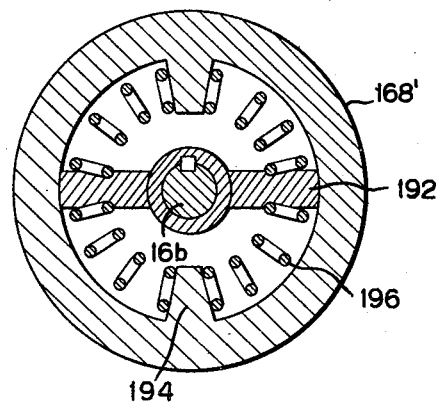

Another embodiment of the invention is shown in FIGS. 8–10, wherein parts corresponding with those shown in FIGS. 2 and 3 have the same reference numerals with the postscript b. In this embodiment of the invention, the steering mechanism includes a steering wheel 14b, a steering shaft 16b and a gear box 12b. A pump 114b, which is identical with that shown in FIG. 6, is interlocked for canjoint rotation with steering shaft 16b through the medium of pinion 110b and gear 112b. The mechanism includes a phase advancing means 22b and a control valve 30b. All of the casings or housings are combined to one body which is arranged around steering shaft 16b.

Delivery and return ports 128b and 130b of pump 114b communicate, through respective annular grooves 154 and 156 in the periphery of shaft 16b, with respective axial passages 158 and 160 formed in shaft 16b. Annular grooves 154 and 156 communicate with each other through an oil passage 162 provided with an adjustable throttle member 164.

Phase advancing means 22b primarily comprises an actuator, having a structure such as shown in FIG. 9, and oil passage 162 provided with throttling member 164. The actuator shown in FIG. 9 comprises a vane 166 extending radially from shaft 16b, and vane 166 has an outwardly opening groove slidably receiving a sealing member 170 spring biased into sealing engagement with the inner surface of a casing 168. Within casing 168, there is a fixed partition wall and abutment 172 which extends radially of the casing and which is diametrically opposite vane 166 when steering wheel 14b, and thus shaft 16b, are in the neutral position. Actuator casing 168 is so mounted, within the housing of phase advancing means 22b, that it can rotate.

A torsion bar 174 carrying a rotary spool valve 168, and forming part of control valve 30b, has one end secured to casing 168. A screw shaft 180, forming part of a known recirculating ball-type of steering gear, is fixedly connected to the free end of torsion bar 174 through a pin 178. A sleeve-type valve body 182 is secured on screw shaft 180 and has a close fit with spool valve 176.

Oil under pressure is supplied to an inlet port 184 from an oil pump or other source of pressurized oil, not shown in the drawings. By relative angular displacement of spool valve 176 and valve body 182, the working oil, under pressure, will enter one of the pressure chambers on opposite sides of a rack-nut-piston 190, through either a first supply and return port 186 or a second supply and return port 188, shown in dotted lines. The oil from the other pressure chamber is returned through outlet port 192. Thus, member 190 will be pushed either to the left or the right, as viewed in the drawing. The construction of the rotary valve including spool valve 176 and valve body 182 is well known to those skilled in the art, so that detailed explanation thereof is believed unnecessary.

At the opposite or left end of actuator casing 168, as viewed in FIG. 8, a resilient means is provided and is shown in section in FIG. 10. This resilient means comprises an annular extension 168' of casing 168, a spring seating bar 192 fixed to extend diametrically of shaft 16b, a pair of spring seating lugs 194 extending radially inwardly of extension 168' and diametrically opposite each other, and four spring sections 196 each installed between seating bar 192 and lug 194, there being one spring in each quadrant of extension 168'.

When steering wheel 14b is rotated clockwise, shaft 16b is also rotated clockwise causing actuator casing 168 to rotate clockwise through the medium of spring seating bar 192, springs 196 and lugs 194. Simultaneously, pump 114b rotates counterclockwise through the medium of pin 110b and gear 112b. Working fluid is forced out through port 128b and drawn in through port 130b, the fluid flowing along the passage 162. Due to throttling member 164 in this passage, pressure will be built up, on the side of port 128b, in correspondence with the angular velocity of pump 114b and thus the angular velocity of steering wheel 14b. As port 128b is connected to the rotary actuator, shown in FIG. 9, through passage 158 in shaft 16b, and as port 130b is connected to the rotary actuator through passage 160 within shaft 16b, the produced pressure will prevail in the right oil chamber, as viewed in FIG. 9. This will cause casing 168 to rotate clockwise relative to shaft 16b.

Thereby, casing 168 will have imparted thereto a displacement proportional to the angular displacement of steering wheel 14b, through the resilient means, and, in addition, will have a further displacement depending on the angular velocity of the steering wheel acting through the actuator. Thus, it will have a considerably further advance in phase or angular displacement than the angular displacement of the steering wheel. The amount of phase advance can be selected or adjusted to a desired value by adjustment of throttle member 164. The power steering gear 12b will respond, in phase advance relation, to the operation of the actuator and through the medium of rotary valve 30b connected to the actuator. Thus, the response of the steering mechanism will be improved to a much greater extent.

In the apparatus just described, if pump 114b is eliminated, and the delivery and return ports 128b and 130b are closed, for example by plugs, a pressure will be produced in the actuator corresponding to the angular velocity of shaft 16b, because oil passage 158 and 160 of the actuator are connected with each other by passage 162 having therein throttling member 164. Consequently, the phase advancing effect identical with that mentioned before can be obtained, even though the increase in displacement is of a lesser magnitude.

From the foregoing description, it will be noted that the phase advancing or lag reducing means comprises a partition in a container containing working fluid, such as oil, and the partition member divides the interior of the container into two chambers and is capable of being moved relative to the container. The two chambers are interconnected by means of a branch passage in which a throttle member is provided. One of the two elements, comprising the container and the partition member, is secured to move with the steering wheel, while the other element is secured to move with a steering member, such as a control valve of power steering mechanism or a linkage of manual steering mechanism. Thereby the steering member is displaced in such a manner that its displacement leads, with respect to phase, the angular displacement of the steering wheel, and thus the steering response characteristics of a dirigible vehicle can be effectively improved.

The present invention can be applied to either power steering mechanism or manual steering mechanism. Furthermore, in the embodiments described, while rotary vane-type pumps 114, 114a and 114b are used, these pumps may be replaced by other known types of pumps such as gear pumps, swash plate pumps and the like.

While specific embodiments of the invention have been shown and described in detail to illustrate the application of the principles of the invention, it will be understood that the invention may be embodied otherwise without departing from such principles.

What is claimed is:

1. The combination of steering lag reducing means, with a vehicle steering mechanism including a steering wheel or the like and a steering element operatively associated with a dirigible wheel to effect steering movement of the latter, said means comprising, in combination, a container member filled with working fluid, such as oil; a partition member movably mounted within said container member and dividing the latter into two chambers sperated by said partition member; means forming a fluid flow passage interconnecting said chambers; throttling means controlling fluid flow through said passage; means connecting one of said members to said steering wheel for movement with the latter; and means connecting the other member to said steering element for movement with the latter; whereby, responsive to steering movement of said steering wheel, one of said members is moved relative to the other thereof to decrease the volume of one chamber and increase the volume of the other chamber to increase the fluid pressure in said one chamber for throttle flow of fluid therefrom to said other chamber through said passage, to advance said other member relative to said one member to effect a lead in the movement of said steering element relative to the movement of said steering wheel.

2. The combination, as claimed in claim 1, including equal strength biasing means engaged between opposite sides of said partition member and said container member and normally biasing said partition member to a neutral position in said container member.

3. The combination, as claimed in claim 1, including a pump operatively driven by said steering wheel responsive to steering movement of said steering wheel; said pump having a pair of ports each communicating with a respective one of said chambers; said pump being driven by said steering wheel, upon steering movement of the latter, in a direction to deliver fluid to said one chamber and to withdraw fluid from said other chamber.

4. The combination, as claimed in claim 1, in which said steering mechanism is a power steering mechanism including a control valve constituting said steering element.

5. The combination, as claimed in claim 1, in which said steering mechanism is a manually operated steering mechanism including a steering linkage incorporating said steering element.

6. The combination, as claimed in claim 1, in which said container member is a cylinder and said partition member is a piston slidable in said cylinder and connected to a piston rod connected in turn to said steering element.

7. The combination, as claimed in claim 6, said means connecting one of said members to the steering wheel including a rotatable steering shaft connected to said steering wheel; and a lever connecting said steering shaft to said cylinder and amplifying the movement transmitted to said cylinder.

8. The combination, as claimed in claim 1, in which said container member is a rotatable casing; said steering mechanism being a power steering mechanism including a rotary control valve operatively connected to said casing; and said means connecting one of said members to the steering wheel including a steering shaft connected to said steering wheel; said partition member comprising a rotary vane in said casing connected to said steering shaft.

9. The combination, as claimed in claim 8, including resilient means interposed between said casing and said steering shaft and transmitting angular displacement of said steering shaft to said coating.

10. The combination, as claimed in claim 3, in which said pump comprises a cylindrical casing, a shaft rotatable coaxially in said casing, a radial vane on said shaft having its radially outer end in sealing engagement with said casing, and a radially inwardly extending vane fixed to said casing and having its inner end in sealing engagement with said pump shaft; said outlets being on either side of said stationary radial vane; and reduction gearing interconnecting said pump shaft and said steering wheel for rotation of said pump shaft at a substantially reduced rate relative to the rate of rotation of said steering wheel.

References Cited

UNITED STATES PATENTS 3,184,921   5/1965   Allen _____ 60—52 X
3,370,422   2/1968   Carlson et al. _____ 60—52

MILTON KAUFMAN, Primary Examiner

U.S. Cl. X.R.

60—52